(12) United States Patent
Glasson

(10) Patent No.: US 7,300,289 B2
(45) Date of Patent: Nov. 27, 2007

(54) ELECTRICAL CORDSET HAVING CONNECTOR WITH INTEGRAL SIGNAL CONDITIONING CIRCUITRY

(75) Inventor: Richard O. Glasson, Whippany, NJ (US)

(73) Assignee: Control Products Inc., East Hanover, NJ (US)

( * ) Notice: Subject to any disclaimer, the term of this patent is extended or adjusted under 35 U.S.C. 154(b) by 0 days.

(21) Appl. No.: 11/240,016

(22) Filed: Sep. 30, 2005

(65) Prior Publication Data

US 2007/0077790 A1    Apr. 5, 2007

(51) Int. Cl.
*H01R 12/00* (2006.01)

(52) U.S. Cl. ...................................... 439/76.1
(58) Field of Classification Search ............ 439/76.1, 439/551, 501–505, 190; 73/727; 340/626, 340/682; 338/68; 324/207; 257/682; 336/68
See application file for complete search history.

(56) References Cited

U.S. PATENT DOCUMENTS

| | | |
|---|---|---|
| 3,403,365 A | 9/1968 | Richards |
| 4,121,504 A | 10/1978 | Nowak |
| 4,231,700 A | 11/1980 | Studebaker |
| 4,286,386 A | 9/1981 | Long |
| 4,288,196 A | 9/1981 | Sutton, II |
| 4,319,864 A | 3/1982 | Kaufeldt |
| 4,386,552 A | 6/1983 | Foxwell |
| 4,480,151 A | 10/1984 | Dozier |
| 4,945,221 A | 7/1990 | Nielsen et al. |
| 4,989,329 A | 2/1991 | Pullen |
| 5,024,250 A | 6/1991 | Nakamura |
| 5,043,949 A | 8/1991 | Shechter |
| 5,046,243 A | 9/1991 | Walker |
| 5,203,723 A | 4/1993 | Ritter |
| 5,233,293 A | 8/1993 | Huang et al. |
| 5,341,684 A | 8/1994 | Adams et al. |
| 5,341,724 A | 8/1994 | Vatel |
| 5,404,661 A | 4/1995 | Sahm et al. |
| 5,694,042 A | 12/1997 | Eaton et al. |
| 5,701,793 A | 12/1997 | Gardner et al. |
| 5,715,595 A * | 2/1998 | Kman et al. ............... 29/845 |
| 5,724,813 A | 3/1998 | Fenelon et al. |
| 5,752,811 A | 5/1998 | Petro |
| 5,834,652 A * | 11/1998 | Koshimizu ............... 73/756 |
| 5,885,108 A | 3/1999 | Gerrans, Jr. |
| 6,123,578 A | 9/2000 | Truett |
| 6,234,061 B1 | 5/2001 | Glasson |
| 6,253,460 B1 | 7/2001 | Schmitz |

(Continued)

FOREIGN PATENT DOCUMENTS

DE    20015895    1/2001

(Continued)

*Primary Examiner*—Alexander Gilman

(57) ABSTRACT

An electrical cordset for connecting a sensor connector used with a piston position sensor located within a high pressure environment and a control system. The cordset has a connector that is comprised of a housing having a cavity formed therein. A high pressure assembly having a plurality of pins is affixed and sealed to an opening in the housing such that inner ends of the pins are located within the cavity and the outer ends of the pins extend outwardly from the housing to be connected to the piston sensor. There is an electrical circuitboard within the cavity and the inner ends of the pins are electrically connected to the circuitboard.

20 Claims, 3 Drawing Sheets

U.S. PATENT DOCUMENTS

| | | |
|---|---|---|
| 6,298,730 B1 * | 10/2001 | Yamagishi et al. ............ 73/723 |
| 6,450,048 B1 | 9/2002 | Samuelson et al. |
| 6,488,116 B2 | 12/2002 | Bailey |
| 6,588,313 B2 | 7/2003 | Brown et al. |
| 6,702,600 B2 | 3/2004 | Glasson |
| 6,707,290 B2 * | 3/2004 | Nyce et al. ............ 324/207.13 |
| 6,716,063 B1 * | 4/2004 | Bryant et al. ................ 439/589 |
| 6,866,545 B2 | 3/2005 | Glasson |
| 6,997,059 B2 * | 2/2006 | Ernsberger et al. ............ 73/753 |

FOREIGN PATENT DOCUMENTS

FR      2794236      12/2000

* cited by examiner

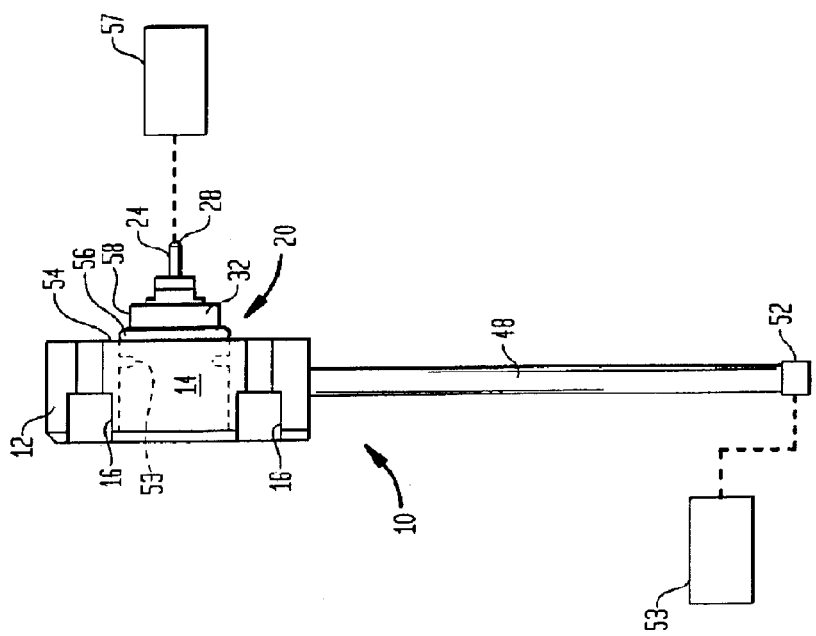
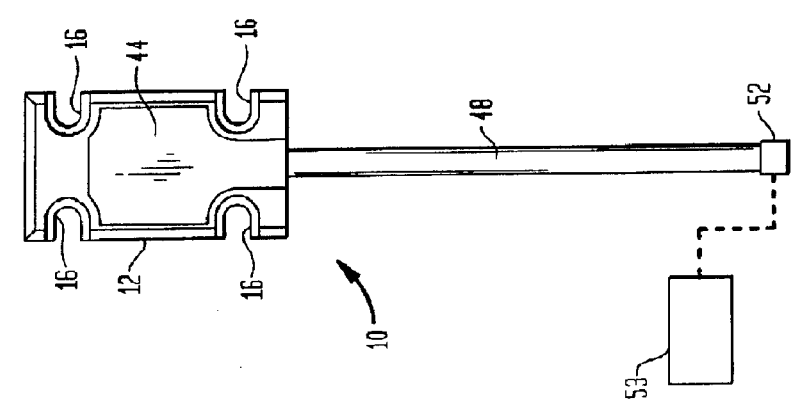

ELECTRICAL CORDSET HAVING CONNECTOR WITH INTEGRAL SIGNAL CONDITIONING CIRCUITRY

FIELD OF THE INVENTION

The invention generally relates to electrical cordsets and, more particularly to a cordset that provides communication between a sensor and a control system with electronic circuitry integrally disposed in a connector.

BACKGROUND

There are many different types of electrical cordsets that are used in differing environments and applications. One rather specialized environment for such cordsets is where there is a high pressure application or hostile environment. An example of such an application is in the use of a position sensor where a sensor is located within a hydraulic or pneumatic cylinder, typically used with outdoor heavy construction equipment, to sense the position of a piston moving within the cylinder. Such sensors are subjected to the high pressures internal of the cylinder and the signals from that internal sensor must be transmitted to a control system that provides power to the sensor while receiving the sensed signals from that sensor to determine the position of the piston within the cylinder. The sensor itself is in a hostile environment as is the particular heavy construction equipment and, therefore, it is mandatory that a cordset connecting the sensor within that environment to the control system also be capable of withstanding the external environment while reliably transmitting the electrical signals.

One such sensor used in that environment is shown and described in U.S. Pat. No. 6,694,861 entitled "PRECISION SENSOR FOR A HYDRAULIC CYLINDER" and which, in turn, is a continuation-in-part of U.S. Pat. No. 6,234,061, issued on May 22, 2001, entitled "PRECISION SENSOR FOR A HYDRAULIC CYLINDER" and the disclosure of both of the foregoing issued U.S. patents are hereby incorporated into this specification by reference.

In the aforesaid patents, there is described a high pressure sensor connector having various male conductive pins that is provided at the sensor. It is desirable to have a cordset to electrically connect that sensor connector to the control system that is located external of the hydraulic component so that the signals from the sensor can be reliably transmitted between that sensor and the control system that both provides power to the sensor and receives the position sensing signals from the sensor to interpret and use those signals in the operation and control of the equipment.

One of such cordsets is shown and described in U.S. Pat. No. 6,866,545 to Glasson, entitled "Electrical cordset with integral signal conditioning circuitry". In that patent, there is a pair of electrical connectors at the ends of the cordset with a casing having signal conditioning circuitry located intermediate those ends. While the cordset of the Glasson patent is a good, usable cordset, there are some drawbacks that could be eliminated in order to create an improved cordset for use in the same environment Some of the drawbacks surrounding the cordset of the Glasson patent concern the degree of difficulty of installing the device for typical field service personnel, the potential breakage of the relatively small pins and the cost of manufacture.

Accordingly it would be advantageous to provide a cordset that is applicable to the harsh conditions of the cordset of the Glasson patent while overcoming the drawbacks so as to have a yet better cordset with a signal conditioning circuit that is easier to install, more robust from the standpoint of the pins and which can be manufactured at a lower cost.

SUMMARY OF THE INVENTION

An electrical cordset according to the principles of the present invention provides a robust electrical connection between a sensor located within the hydraulic or pneumatic cylinder and the connector of an electrical control system located external of the cylinder.

In one aspect, the present cordset provides a solid, reliable electrical connection between the sensor and a connector on the electronic control circuitry and which comprises a connector that is constructed so as to contain an electrical circuitboard having functionality such as signal conditioning. The connector includes a housing that encloses the electrical circuitboard. A pressure assembly is provided that is pressure sealed to the housing and which includes a molded plastic insert having pins, preferably two pins, that pass through the molded plastic insert and a bushing that fits into an opening in the housing and is sealed therein. The pressure assembly is also sealed to the hydraulic cylinder by a standard pressure seal.

According to one embodiment, one end of each of the pins is an exterior end that extends outwardly of the housing and can be readily plugged into a corresponding female connector in the sensor that is located within the hydraulic cylinder. The other, inner end of each of the pins is located within a cavity within the housing. The inner ends of the pins are physically directly affixed to the electrical circuitboard, thereby making the electrical connection with the signal conditioning circuitry of the electrical circuitboard by means of the inner end of the pin actually entering into plated holes in the circuitboard. Thus, no additional wiring is needed in order to complete the electrical and physical connection between the inner ends of the pins and the circuitry on the circuitboard. The cordset also has a cable with wires that are electrically connected to the electrical circuitboard and which extends outwardly from the housing to be connected with the further electronic circuits that use the signals from the sensor to determine the position of the piston within the hydraulic cylinder.

As can now be understood, the advantages of the present cordset with respect to the cordset shown and described in the aforementioned U.S. Pat. No. 6,866,545 can be explained. The installation is facilitated since the present cordset has the pressure seal integral with the housing that is affixed to the cylinder and, there are no small individual parts to assembly. Basically, the connector of the present invention is a "push-on" unit to the hydraulic cylinder. Also, since the housing of the connector is affixed to the hydraulic cylinder by means of bolts, the affixation is very secure and there is no problem with twisting the connector that could damage the pin connections.

As to the breakability of the pins, the number of pins has been reduced from five to two, thereby allowing the pin diameter to be increased make the pins more robust and less susceptible to breakage. There is also less likelihood of breakage with the present cordset when installed as the housing is preferable cast stainless steel that has a low profile and therefore less likely to be struck and broken. When affixed to the cylinder, the connector becomes integral to the cylinder structure.

Lastly the cost of manufacture has also been reduced since the requirement for a waterproof threaded connector has been eliminated and the number of cable sections reduced. Also, the solder connections are eliminated between the connector pins pressure and the printed circuitboard since the connector pins are affixed directly to the circuitboard by having the pins swaged into plated through holes in the printed circuitboard to carry out the electrical connection therebetween.

BRIEF DESCRIPTION OF THE DRAWINGS

A more complete understanding of the invention may be obtained from consideration of the following description in conjunction with the drawings in which:

FIG. 3 is a top view of the cordset of the present invention; and

FIG. 4 is a side view of the cordset of the present invention.

DETAILED DESCRIPTION

Figure 1:
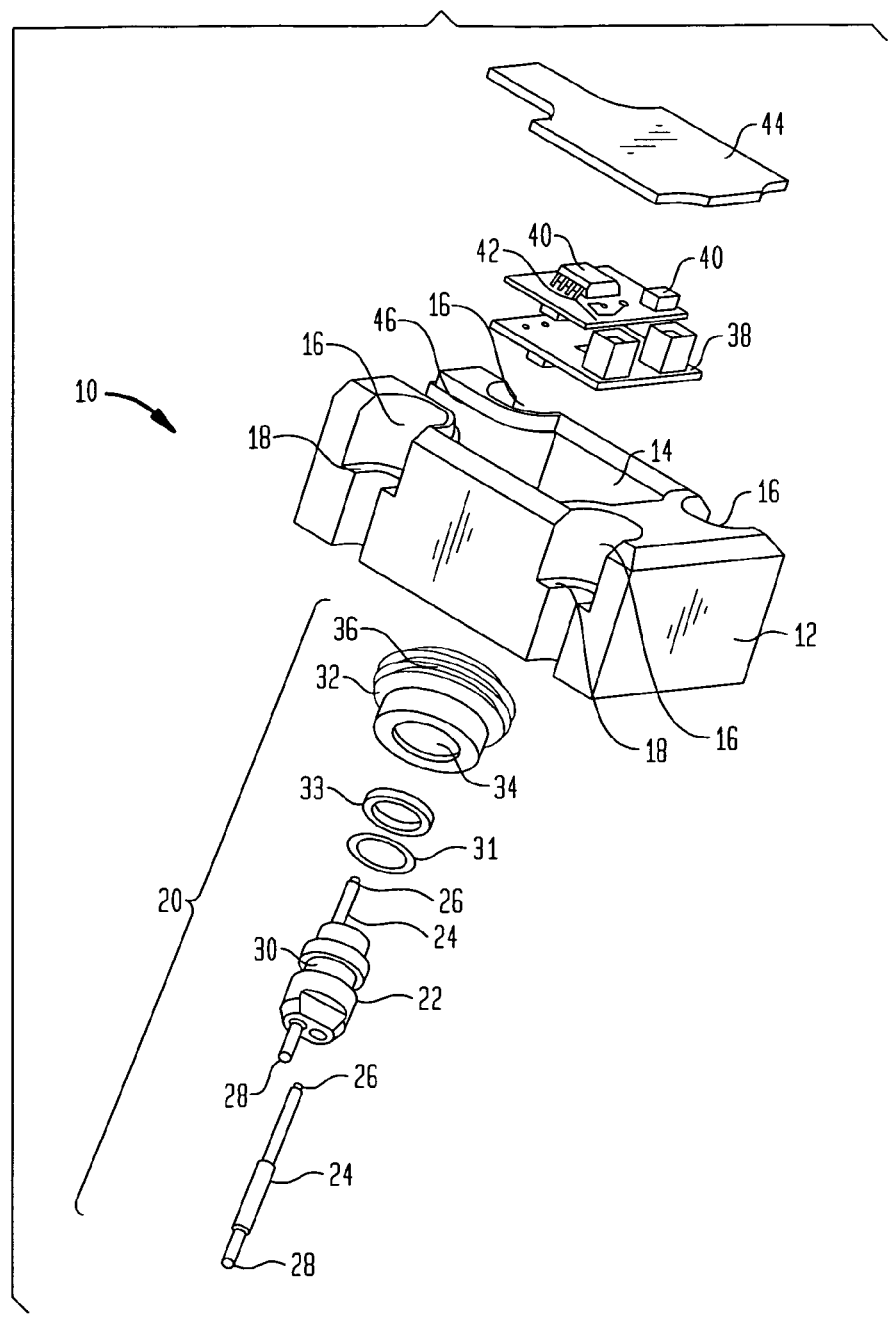
FIG. 1 is an exploded view of a cordset constructed in accordance with the present invention.

In FIG. 1, there is shown an exploded view of a cordset 10 constructed in accordance with the principles of the present invention. As can be seen, the cordset 10 includes a housing 12 that has a cavity 14 formed therein and has a plurality of bolt slots 16 for receiving the heads of bolts that rest on bolt ledges 18. The bolts are used in the installation of the invention as will be later explained. In one embodiment, the housing 12 is made out of cast stainless steel, however, other strong materials could be used in the construction of the housing 12.

There is high pressure assembly 20 and which comprises a molded pin insert 22 that is a plastic molded insert having two pins 24 that pass therethrough. In order to better define the pins 24, each has an inner end 26 and an outer end 28. In an exemplary embodiment, the diameter of the pins is about 0.075 inches. As shown in the illustrated embodiment, there are two pins 24, however, there may be a greater or lesser number of pins 24 that can be used consistent with the principles of the present invention. As can be seen, the molded pin insert 22 also has an annular groove 30 formed therein for locating and retaining an O-ring 31 and a back-up ring 33 in the assembly of the high pressure assembly 20 to be described. The molded pin insert 22 can be constructed as shown and described in U.S. Pat. No. 6,702,600 of Richard O. Glasson, issued Mar. 9, 2004 and entitled "High Pressure Seal Assembly For A Hydraulic Cylinder" and the disclosure of which is hereby incorporated herein in its entirety by reference.

The high pressure assembly 20 also includes an annular bushing 32 having a through opening 34 and which receives the molded pin insert 22 that fits within and is firmly retained within the opening 34 by means of the O-ring 31 and back-up ring 33 located within the annular grove 30. The annular bushing 32 also has an annular grove 36 that receives an O-ring to seal the annular bushing 32 into a through opening formed in the annular bushing 32.

There is an electrical circuitboard 38 that has mounted thereon the various electronic components 40 that create for example a signal conditioning circuitry used to modify and condition the signals that pass through the electrical cordset 10 between a position sensor located within a hydraulic cylinder and a control system, not shown. As will be seen, the electrical circuitboard 38 is located and enclosed within the cavity 14 of the housing 12 when the cordset 10 is assembled for use.

The electrical circuitboard 38 has a pair of holes 42 that are aligned with the inner ends 26 of the pins 24 and generally have their internal diameters dimensioned to be about the same as the outer diameters of the inner ends 26 of pins 24. Finally, there is a cover 44 that covers the open cavity 14 and rests upon an inner ledge 46 formed in housing 12. The cover 44 is constructed to provide electromagnetic protection to the electronic components 40 within the cavity 14 and in the final assembly, the cavity 14 is filled with a potting compound prior to the installation of the cover 44 to seal the components within the housing 12 to be impervious to weather or other hostile conditions in the surrounding atmosphere.

Figure 2:
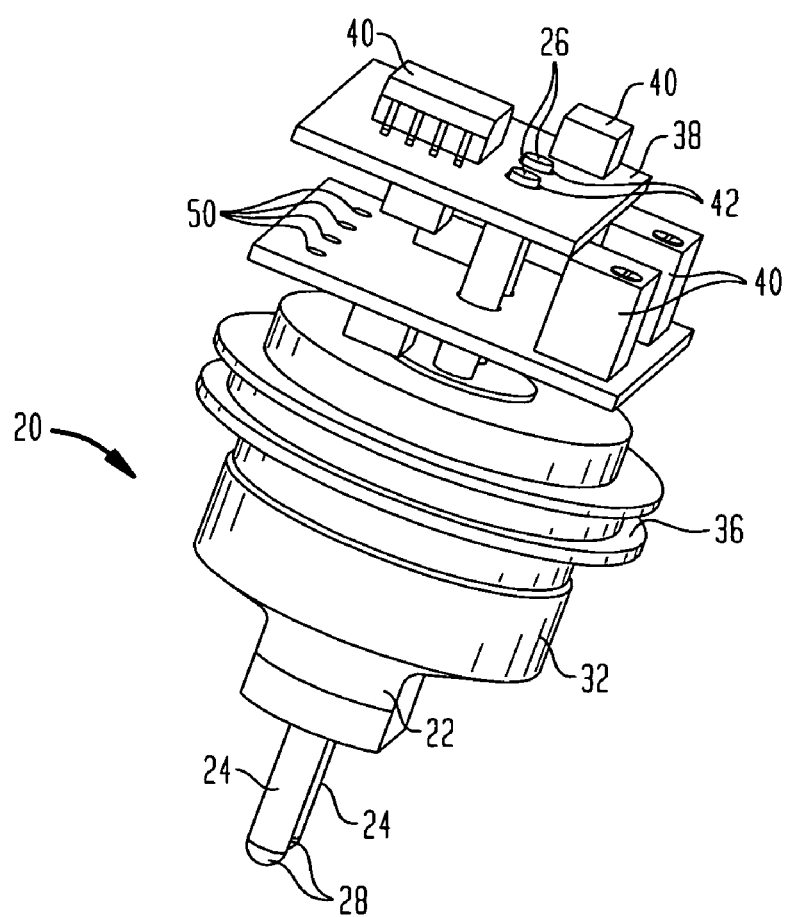
FIG. 2 is a perspective view of the connector for the cordset of FIG. 1.

Turning now to FIG. 2, there is shown a perspective view of the high pressure assembly 20 and electrical circuitboard 38 absent the housing 12. As can be seen, the printed circuitboard 38 has been affixed to the high pressure assembly 20 and that affixation is carried out by passing the inner ends 26 of the pins 24 through the holes 42. The holes 42 are internally through plated with a conductive material such that the electrical connection between the pins 24 and the electronic components 40 mounted on the electrical circuitboard 38 is readily accomplished by the interaction of the inner ends 26 of pins 24 passing through holes 42. After passing through the holes 42, it can be seen that the inner ends 26 are hollow and can be swaged to improve the affixation of the electrical circuitboard 38 to the inner ends 26 of the pins 24.

As such, the electrical connection between the electrical circuitboard 38 and the pins 24 is accomplished without the use of soldered connections, additional wiring or the like. It need also be noted that the outer ends 28 of the pins 24 extend outwardly from the high pressure assembly 20 and therefore can be used to connect to a female connector that is on a position sensor as described in U.S. Pat. Nos. 6,234,061 and 6,694,861 located within a cylinder in order to detect the position of a piston moving therein.

Turning now to FIG. 3, taken along with FIGS. 1 and 2, there is shown a top view of a cordset 10 constructed in accordance with the present invention and illustrating the bolt slots 16 that are used to secure the housing 12 to a cylinder and the cover 44 that encloses the cavity 14 filled with the potting compound. As also seen, an electrical cable 48 extends outwardly from the housing 12 and contains multiple wires that can connect with the terminal contacts 50 (FIG. 2) on the electrical circuitboard 38. The potting compound assists in retaining the electrical cable 48 in its desired position with respect to the housing 12.

There can be a standard connector 52 located at the distal end of the electrical cable 48 for connecting to an electronic circuit that receives the signals from the position sensor located within the cylinder and interprets those signals to ascertain the location of the piston within that cylinder. As such the connector 52 either directly or ultimately to a control circuit 53 that receives the electrical signals from the position sensor located within a cylinder and interpret the signals in order to determine the position of a piston within that cylinder.

Turning finally to FIG. 4, there is shown a side view of a cordset 10 of the present invention. In this view, there can be seen the high pressure assembly 20 positioned within the through opening 53 in the housing 12 such the flat forward surface 54 of the housing 12, when assembled, fits flush against a flat surface formed on the cylinder and the high pressure assembly 20 fits into an opening formed in the cylinder so that the outer ends 28 of the pins 24 can be inserted into a female connector on the position sensor 57. An O-ring 56 assists in the seal between the high pressure assembly 20 and the cylinder. There is also a pressure seal formed between the outer periphery 58 of the annular bushing 32 so as to interfit with and be sealed within a slight tapered opening in the cylinder, creating a normal industry standard pressure seal between the high pressure assembly 20 and the cylinder.

Thus, taking FIGS. 1–4, the final cordset 10 is readily constructed and which has a connector that attaches to the cylinder with pins 24 having outer ends 28 that extend into the cylinder, when affixed thereto, to enter a female connector on the position sensor. The connector features a robust housing that is firmly affixed to the cylinder by means such as bolts and the housing has a cavity 14 that contains the electrical circuitboard 38 in a protective environment. The electrical circuitboard is 38 electrically affixed and connected to the inner ends 26 of the pins 24 by inserting the inner ends 26 through internally plated holes 42 in the electrical circuitboard without the need for soldered connection or additional wires. The ultimate cordset 10 is sufficiently rugged to prevent breakage of the pins, readily installed and yet can be manufactured economically.

It is to be understood that the invention is not limited to the illustrated and described form of the invention contained herein. It will be apparent to those skilled in the art that various changes may be made without departing form the scope of the invention and the invention is not considered limited to what is shown in the drawings and described in the specification.

What is claimed is:

1. An electrical cordset for connecting to an electrical sensor of a hydraulic cylinder, the cordset comprising:
   a housing having a cavity formed therein, said housing adapted to be affixed to a hydraulic cylinder;
   a high pressure assembly being partially disposed in the cavity and affixed to and pressure sealed to said housing and having at least one electrical pin extending through the high pressure assembly, said at least one electrical pin having an outer and an inner end;
   an electrical circuitboard located within said cavity, said outer end of said at least one electrical pin extending outwardly from said housing and adapted to be connected to an electrical sensor of a hydraulic cylinder and the inner end of said at least one pin being affixed to the electrical circuitboard within said cavity;
   and an electrical cable electrically connected to said electrical circuitboard.

2. The electrical cordset as defined in claim 1 wherein the housing is cast stainless steel.

3. The electrical cordset as defined in claim 1 wherein the inner end of the at least one electrical pin is swaged within said hole.

4. The electrical cordset as defined in claim 1 where the housing has at least one opening to allow a bolt to pass through the opening to bolt the housing to a hydraulic cylinder.

5. The electrical cordset as defined in claim 1 wherein the electrical circuitboard includes signal conditioning circuitry.

6. The electrical cordset of claim 1 wherein the housing is filled with a potting compound.

7. The electrical cordset as defined in claim 1 wherein the electrical circuitboard has a hole and the inner end of the at least one pin is affixed to said electrical circuitboard by entering into said hole.

8. The electrical cordset as defined in claim 7 wherein the hole in the electrical circuitboard is internally plated with a conductive material.

9. The electrical cordset as defined in claim 1 wherein the high pressure assembly comprises a molded plastic insert having a pair of pins extending therethrough, and an annular bushing and wherein said molded plastic insert is sealed within said annular bushing.

10. The electrical cordset of claim 9 wherein the annular bushing is sealed within the housing by means of an O-ring.

11. A system for determining the position of a piston within a cylinder, the system comprising a position sensor located within the cylinder to determine the position of the piston and to produce electrical signals representative of that position, a control system located external of the cylinder to interpret the signals from the position sensor, and an electrical cordset providing electrical communication between the position sensor and the control system, the cordset comprising a housing having a cavity formed therein, said housing adapted to be affixed to the cylinder, a high pressure assembly being partially disposed in the cavity and affixed to said housing and having at least one electrical pin extending through the high pressure assembly, said at least one electrical pin having outer and inner ends, an electrical circuitboard located within said cavity, said outer end of said at least one electrical pin adapted to be connected to the position sensor and the inner end of said at least one pin being affixed to said electrical circuitboard within said cavity, and an electrical cable electrically connected to said electrical circuitboard.

12. The system as defined in claim 11 wherein the housing contains a potting compound to seal the electrical circuitboard within the housing.

13. The system as defined in claim 11 wherein said high pressure assembly is sealed within said housing by mean of an O-ring.

14. The system as defined in claim 6 wherein said high pressure assembly has two pins extending therethrough.

15. A method of installing a cordset for completing an electrical connection between a sensor within a cylinder and an electrical control system, the method comprising the steps of:
   providing a housing having a cavity,
   providing a high pressure assembly including at least one pin having an outer end and an inner end extending outwardly therefrom,
   sealing the high pressure assembly to the housing to position the inner end of the at least one pin within the cavity and the outer end of the at least one pin extending outwardly from the housing,
   providing a electrical circuitboard having a plurality of electronic components mounted thereon,
   positioning the electrical circuitboard within the cavity of the housing and electrically connecting the inner end of the at least one pin to the electrical circuitboard;
   providing an electrical cable; and
   connecting one end of the electrical cable to the electrical circuitboard.

16. The method of installing an electrical cordset as defined in claim 15 wherein the step of electrically connecting the inner end of the at least one pin comprises inserting the inner end of the pin through an internally plated hole in the electrical circuitboard.

17. The method of installing an electrical cordset as defined in claim 16 further including the step of swaging the inner end of the at least one pin to the plated hole in the electrical circuitboard.

18. The method of installing an electrical cordset as defined in claim 15 further including the step of filling the cavity with a potting compound.

19. The method of installing an electrical cordset as defined in claim 15 wherein the step of providing a high pressure assembly including at least one pin having an outer end and an inner end extending outwardly therefrom comprises providing a high pressure assembly having two pins.

20. An electrical cordset for connecting to an electrical sensor of a hydraulic cylinder, the cordset comprising:

a housing having a cavity formed therein, said housing adapted to be affixed to a hydraulic cylinder;

a high pressure assembly affixed to and pressure sealed to said housing and having at least one electrical pin extending through the high pressure assembly, said at least one electrical pin having an outer and an inner end, wherein the high pressure assembly comprises a molded plastic insert having a pair of pins extending therethrough, and an annular bushing and wherein said molded plastic insert is sealed within said annular bushing;

an electrical circuitboard located within said cavity, said outer end of said at least one electrical pin extending outwardly from said housing and adapted to be connected to an electrical sensor of a hydraulic cylinder and the inner end of said at least one pin being affixed to the electrical circuitboard within said cavity; and an electrical cable electrically connected to said electrical circuitboard.

* * * * *